United States Patent [19]
Woo

[11] Patent Number: 5,469,408
[45] Date of Patent: Nov. 21, 1995

[54] HIGH RESOLUTION GEOPHONE

[75] Inventor: Daniel M. Woo, Missouri City, Tex.

[73] Assignee: Shaw Industries Limited, Rexdale, Canada

[21] Appl. No.: 278,022

[22] Filed: Jul. 20, 1994

[51] Int. Cl.$^6$ .................................................. H04R 9/02
[52] U.S. Cl. .................................................. 367/182
[58] Field of Search .................................. 367/182, 183, 367/185, 187

[56] References Cited

U.S. PATENT DOCUMENTS

| | | |
|---|---|---|
| 2,748,370 | 5/1956 | Baltosser . |
| 2,947,529 | 8/1960 | Schwartz et al. . |
| 3,170,736 | 2/1965 | Wright . |
| 3,344,397 | 9/1967 | Elliott et al. . |
| 3,582,875 | 11/1968 | Van Wambeck et al. .............. 367/182 |
| 3,628,383 | 12/1971 | Tikanen et al. . |
| 3,738,445 | 6/1973 | Wilson et al. . |
| 3,742,441 | 6/1973 | Riley . |
| 3,913,063 | 10/1975 | Sears . |
| 3,953,829 | 4/1976 | Boyle . |
| 4,128,010 | 12/1978 | Aske . |
| 4,144,520 | 3/1979 | McNeel . |
| 4,152,692 | 5/1979 | McNeel . |
| 4,159,464 | 6/1979 | Hall, Jr. . |
| 4,169,384 | 10/1979 | Flanner et al. . |
| 4,285,054 | 8/1981 | McNeel . |
| 4,323,994 | 4/1982 | Coogler . |
| 4,458,344 | 7/1984 | Coogler . |
| 4,504,932 | 3/1985 | Sundt . |
| 4,618,949 | 10/1986 | Lister ..................................... 367/171 |
| 4,623,991 | 11/1986 | Vitringa . |
| 4,685,094 | 8/1987 | Vitringa et al. . |
| 5,119,345 | 6/1992 | Woo et al. . |
| 5,134,594 | 7/1992 | Woo . |
| 5,256,920 | 10/1993 | Porzio ..................................... 310/13 |
| 5,332,488 | 7/1994 | Mitsuji ..................................... 205/181 |

OTHER PUBLICATIONS

Huan, S. L. and Pater, A. R. (1985, Aug.). Analysis and prediction geophone performance parameters. *Geophysics*, vol. 50, No. 8, pp. 1221-1228.

*Primary Examiner*—Charles T. Jordan
*Assistant Examiner*—Christopher K. Montgomery
*Attorney, Agent, or Firm*—Vaden, Eickenroht, Thompson & Feather

[57] ABSTRACT

A geophone is disclosed that has a cylindrical housing closed at one end by a bottom and the other end by a top. A magnet assembly of a rare earth magnet with pole pieces at each end of the magnet is centrally mounted in the housing providing an annular space between the magnet assembly and the housing. A coil form is located in the annular space. Springs support the coil form for axial movement relative to the magnet assembly along the longitudinal axis of the housing. The rare earth magnet produces a magnetic field sufficiently strong that the pole pieces can be made longer than the coils on the coil form thereby provided a uniform magnetic field in which the coils move thereby reducing the amount of harmonic distortion produced by the geophone.

18 Claims, 6 Drawing Sheets

HIGH RESOLUTION GEOPHONE

This invention relates to geophones generally, and in particular to a velocity geophone.

A geophone is an instrument used to transform seismic energy into an electrical voltage by responding to the velocity of a seismic wave. The most common geophone is the velocity geophone wherein a mass is suspended by springs from a case in a magnetic field established by a permanent magnet mounted in the case. This mass includes wire (a coil) wrapped on a coil form. A seismic wave moves the casing and the magnet, while the coil initially lags behind and then is moved back and forth through its original position by the springs in the manner of a pendulum.

Since charged particles in a material body, such as a coil, that moves at right angles to a magnetic field experience a force at right angles to both the magnetic flux density "B" (the number of magnetic lines of force per unit area at right angles to the motion of the body) and velocity "v", the relative movement of the magnetic field with respect to the coil of length "l" generates a voltage across the coil in accordance with the following equation:

$$V = vBl \qquad (1)$$

The voltage is proportional to the relative velocity of the coil caused by the seismic energy with respect to the magnet. It is presumed that the magnetic flux density is substantially constant. A circuit is completed to monitor the voltage signals generated by the geophones, which are used to predict the location of subsurface formations that reflect the seismic energy.

The voltage signals generated by the geophones are subject to distortion primarily from ground roll and harmonic distortion.

Ground roll is surface-wave energy that travels along or near the surface of the ground. Source and geophone patterns, frequency filtering, and stacking are used to minimize the effects of ground roll. The source and geophone patterns, also referred to as spacial arrays, are specifically arranged to prevent the collection of ground roll. This technique is relatively effective during two-dimensional seismic data gathering, but is ineffective for three-dimensional seismic data gathering. The remaining ground roll minimization techniques are post-data gathering processing techniques, which are also more effective on two-dimensional seismic data. The harmonic distortion caused by the geophone inhibits the success of these post-data gathering processing techniques at removing the ground roll.

Harmonic distortion is the non-linear distortion characterized by the generation of harmonics of an input frequency. It is the common belief that geophone springs are the cause of harmonic distortion and thus, several different designs of geophone springs have been developed in an effort to reduce the generation of extra harmonics, including the springs disclosed in U.S. Pat. Nos. 3,742,441 and 4,623,991. Although somewhat successful in reducing harmonic distortion, the newly developed spring designs do not completely solve the problem and the remaining distortion still has a significant impact on the resolution of the input signal. As stated above, the impact is much more noticeable in three-dimensional seismic data than in two-dimensional seismic data. This problem is becoming more significant since the trend in the industry is to gather three-dimensional seismic data, because more information about the subsurface can be gathered during such a data gathering session.

In accordance with the present invention it has been found that a coil traveling through a non-uniform magnetic field also significantly contributes to the non-linearity of the geophone circuit and thus contributes to the harmonic distortion. The most commonly used velocity geophone configuration is shown in FIG. 1, where a permanent magnet assembly comprising magnet 12, capped with pole pieces 13 and 14, is mounted in case 16 to establish a magnetic field, represented by lines 18, in the air gap 19 between the magnet assembly and the case. Annular coil form 20 having wire coils 22 and 23 mounted thereon is suspended in the annular space between the magnet assembly and case 20 by springs 24 and 25 so that the coils move in the magnetic field when a seismic wave moves the case as explained above.

The pole pieces are pieces of magnetic material that are located at opposite ends of the permanent magnet and are shaped to control the distribution of the magnetic flux in the adjacent air gap. As shown in FIGS. 1 and 2, the magnetic flux in the air gap is formed only in the space between the pole pieces and the case, which is much shorter than the length of coils 22 and 23. Yet the width of the pole pieces cannot be increased beyond that shown because the size and strength of the magnet will not allow it, while maintaining the overall dimension of the geophone the same as that shown in FIG. 1. If the size of the magnet is reduced and the size of the pole pieces increased, the magnetic field produced will not be strong enough for the geophone to function properly.

The magnetic field of the prior art magnet shown in FIG. 1 is not uniform in the annular space between the magnet and the case, where coils 22 and 23 are located. FIG. 2 shows the relative magnetic flux density distribution associated with prior art magnets measured from the middle of the magnet out beyond the end of one pole. This graph shows that the magnetic flux density is not uniform over any displacement. It is now believed that this non-uniformity of the magnetic field introduces the undesirable harmonics that distort the resulting signal.

Therefore, it is an object and feature of this invention to provide a geophone with a shorter, stronger magnet and pole pieces that provides two uniform magnetic fields in the annular space between the pole pieces and the case that are wider than the coils carried by the coil form of the geophone to thereby substantially reduce harmonic distortion in the output signal of the geophone.

It is another object and feature of this invention to provide a geophone that contributes less harmonic distortion to a seismic input signal thereby producing a high resolution linear output signal by generating a more uniform magnetic field in the annular space between the magnet and the case through which the coils travel.

Attempts to design a geophone that produces a uniform magnetic field have been discouraged by the need to maintain the overall length of the geophone to approximately 1.25 inches (31.7 mm.), the industry standard. Therefore, it is another object of this invention to provide a geophone with a uniform magnetic field and a length equal to the overall industry standard.

It is a further object of this invention to provide such a geophone having a substantially stronger magnetic field to increase the strength of the output signal.

These and other objects, advantages, and features of this invention will be apparent to those skilled in the art from a consideration of this specification including the attached drawings and appended claims.

Figure 3:
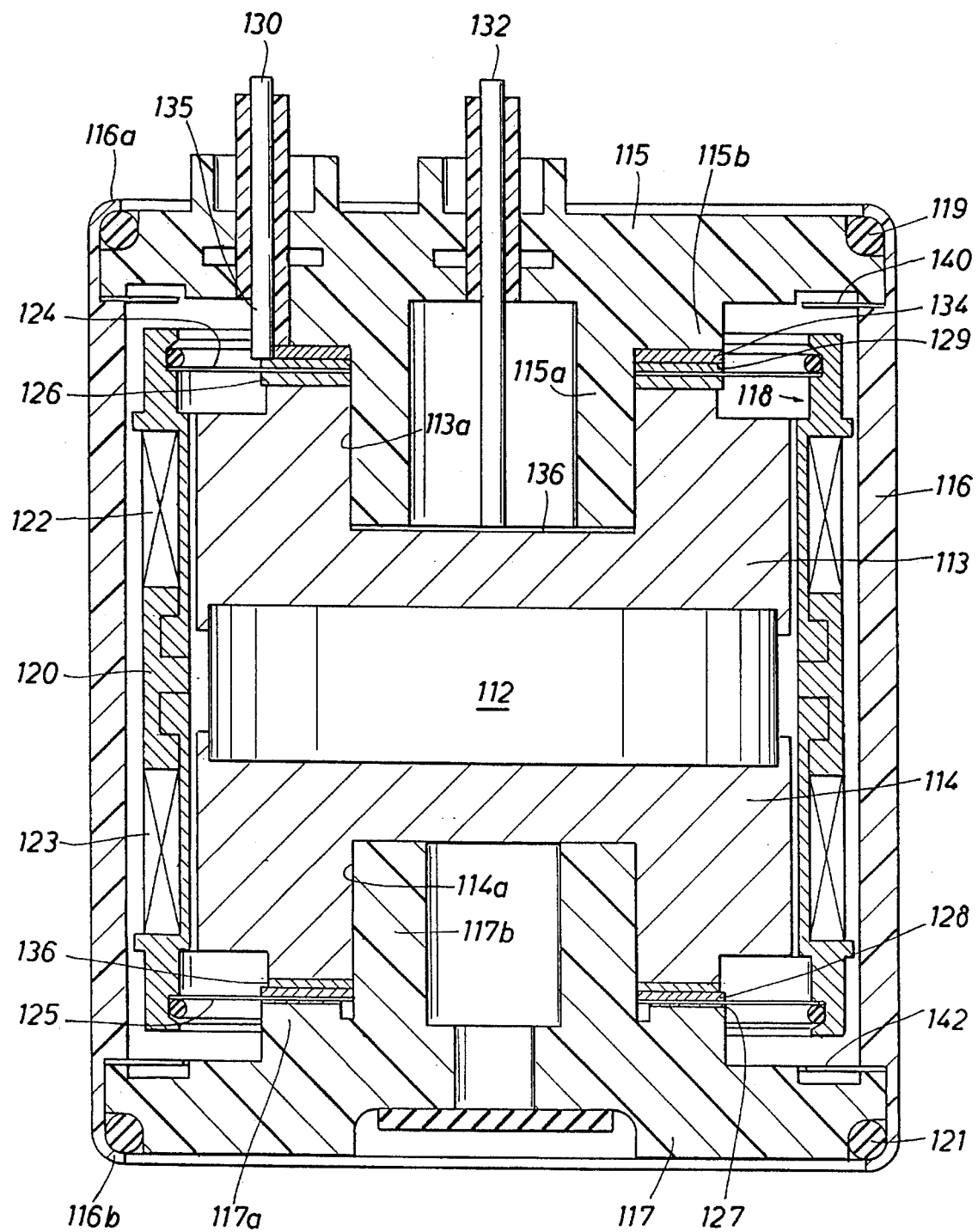
FIG. 3 is a vertical, cross-sectional view through a geophone embodying the construction of this invention.

The geophone shown in FIG. 3 includes a permanent magnet assembly consisting of magnet 112 having pole pieces 113 and 114 positioned at each end of the magnet, case 116 and coil form 120, on which wire coils 122 and 123 are wrapped, mounted in the annular gap between the magnet and the case. Magnetic field 118 is established between poles 113 and 114 and case 116. Coil form 120 is supported for movement relative to the longitudinal axis of the case in the annular gap by springs 124 and 125, so that coils 122 and 123 will move relative to the magnet and the case in response to received seismic energy and produce a voltage that is proportional to the relative velocity of the coil with respect to the magnet.

Springs 124 and 125 are spider springs made from thin discs of spring material, usually beryllium copper, having inner and outer rings connected by relatively thin, arcuate spring arms.

Case 116, header 115, and bottom support member 117 are made of non-conducting material. The header and bottom support member are held in place in opposite ends of the case by O-rings 119 and 121 and the crimped ends 116a and 116b of the case. Spring 125 is pressed against insulating washer 127, which rotates freely relative to the spring and bottom support member, and thus, boss 117a of bottom member 117 by annular spring 136. Copper washer 128, which rotates freely relative to the spring, is positioned between annular spring 136 and spring 125. Pole piece 114 has centrally located blind hole 114a that is positioned over central boss 117b of the bottom support member and is in electrical contact with annular spring 136 and thus spring spider 125. Pole piece 113 is electrically isolated from spring spider 124 by insulation ring 126, which moves relative to both spring spider 124 and pole piece 113. Contact ring 134 encircles cylindrical boss 115a located in blind hole 113a of pole piece 113. The contact ring is clamped between annular shoulder 115b of the header and copper washer 129 to electrically connect the contact ring to spring spider 124.

Terminals 130 and 132 are molded into header 115. Terminal 130 is in electrical contact with spring 124 through contact ring 134 and conductor 135. Spring 124 is electrically connected to silver plating on aluminum coil form 120 by means of a retainer ring arrangement. Coils 122 and 123 are soldered to the silver plating on the aluminum coil form between the two coils. Therefore, the coils are electrically connected to terminal 130. Spring spider 125 is also electrically connected to the silver plating of coil form 120 on the end opposite from spring 124 by a retainer ring arrangement and is electrically connected to pole piece 114 through spring 136. Pole piece 114 is electrically connected to terminal 132 through permanent magnetic 112 and pole piece 114. Conductive contact material 136 is placed between terminal 132 and pole piece 113 in order to enhance the electrical contact.

Leaf springs 140 and 142 are lodged between case 116 and top and bottom support member, respectively, in order to prevent coil form 120 from colliding with either the top or bottom support member, and reduce the amount of axial shock imparted on the coil form during rough handling.

In the preferred embodiment of this invention, the overall length of geophone case 116 is approximately 1.25 in. (31.7 mm.), the industry standard. The length of the magnet is approximately 0.20 in. (0.51 mm.) and the length of each pole piece, measured from the magnet to the top and bottom of the respective pole pieces, is approximately 0.25 in. (0.64 mm.).

Figure 5:
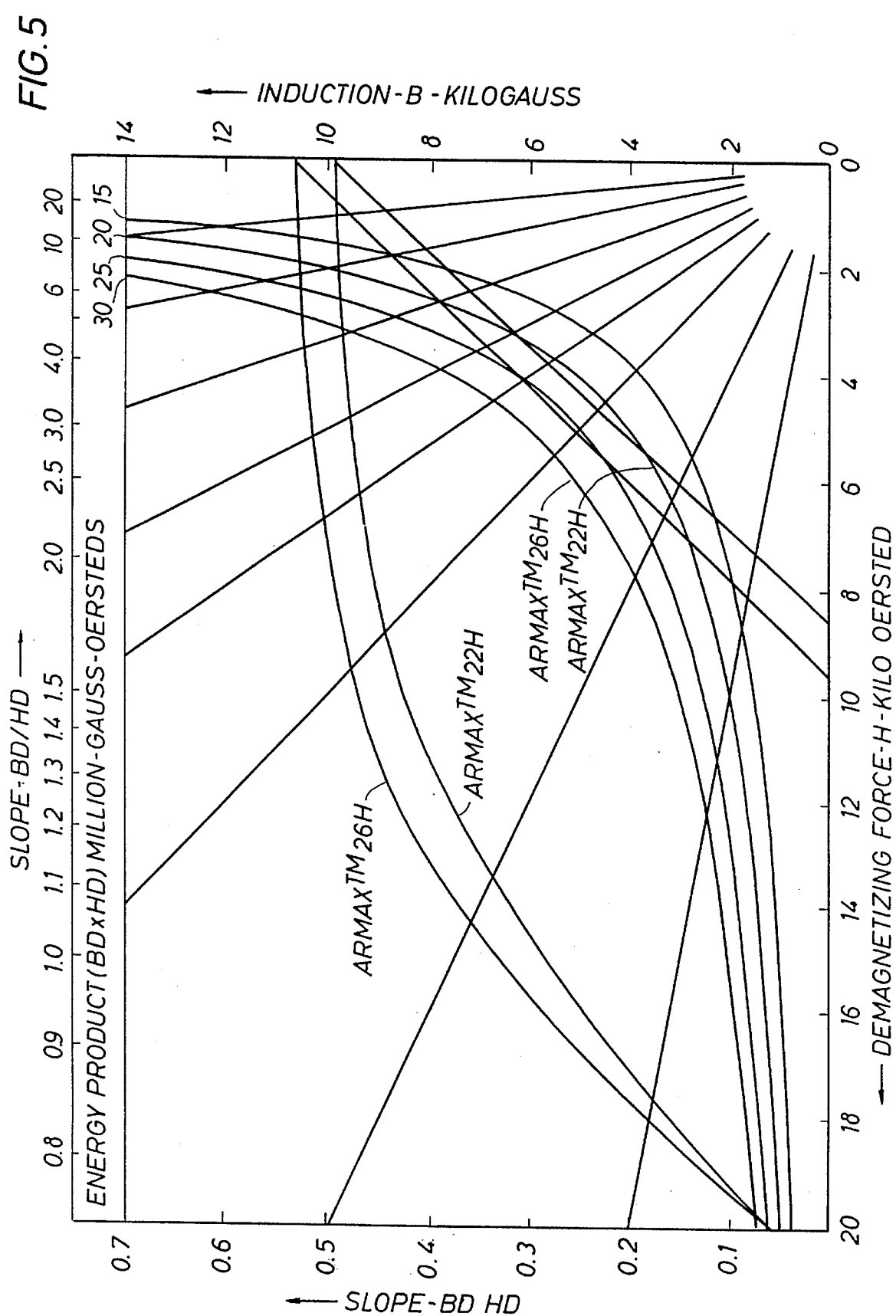
FIG. 5 is a graphical representation of the demagnetization curve for the magnet used in the preferred embodiment of this invention.

The permanent magnetic material used should be any magnetic material having a magnetic field strong enough to accommodate the pole pieces of the size mentioned above and produce a magnetic field strong enough to generate an output response from the coils. Any magnet that has high coercive force, typically more that 4000 oersteds, and residual induction of greater than 6000 gauss can be used to produce a uniform magnetic field. Magnets made from rare earth materials have been found to function very well, such as Samarium Cobalt Armax 22, manufactured by Arnold Engineering of Illinois. FIG. 5 shows the demagnetization curves associated with a Sumarian Cobalt Armax 22 magnet at 25° centigrade.

The Armax 22 magnet is quite brittle. Therefore, a nickel plating of approximately 500 micro-inches thickness is applied to the magnet before it is installed in the geophone to reduce the likelihood of the magnet chipping during manufacturing and field use. The nickel plating is also manufacture by Arnold Engineering.

Figure 4:
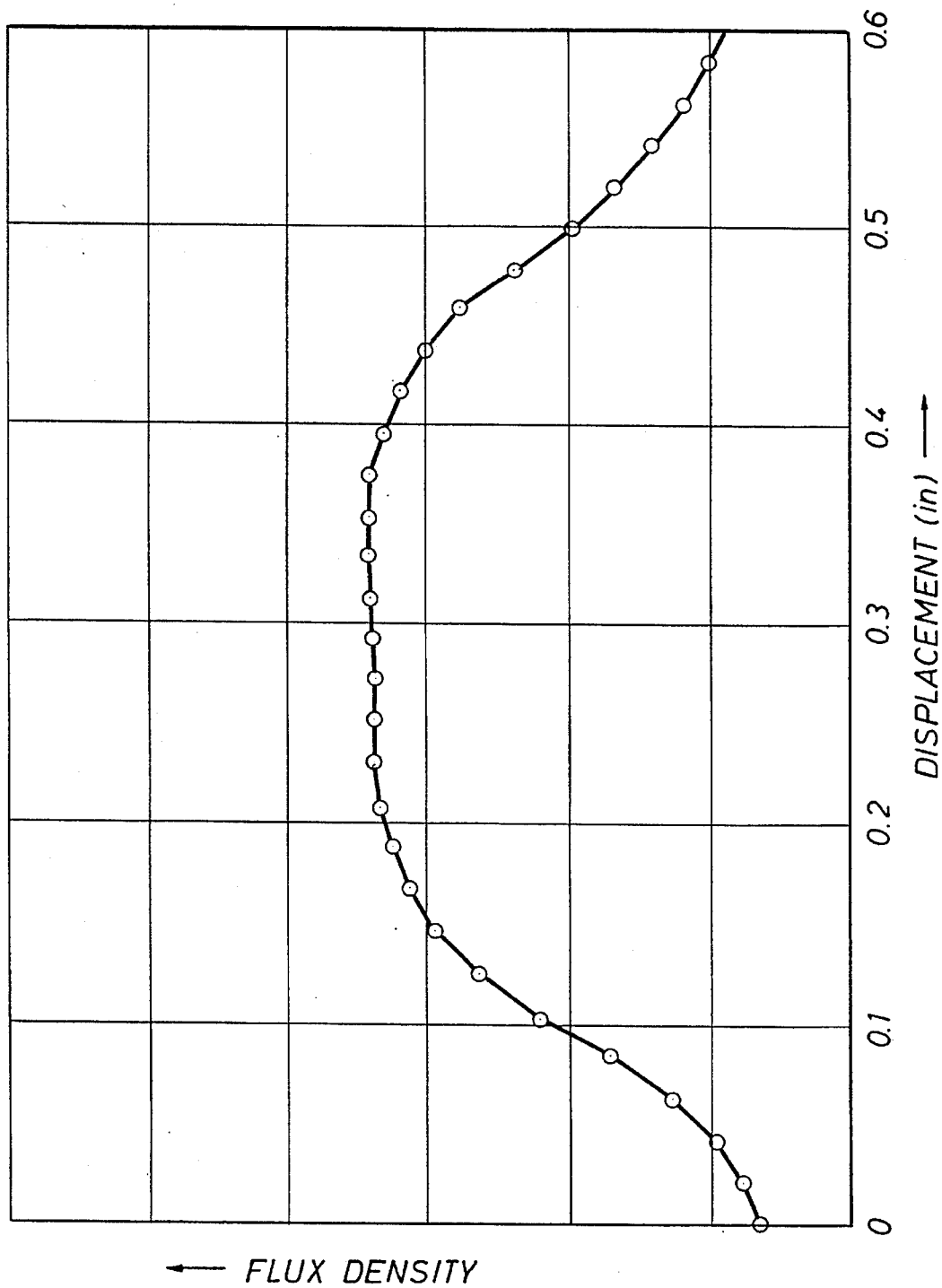
FIG. 4 is a graphical representation of the magnetic field density of the geophone of FIG. 3.

The increased pole length relative to the length of the respective coils provides a more uniform magnetic field 118 through which coils 122 and 123 travel and results in a reduction in the harmonic distortion of the output signal of the geophone. FIG. 4 shows the graphical representation of magnetic flux density distribution of the magnetic field produced by a geophone such as the one shown in FIG. 3. The density is measured from the middle of magnet 112 to a point 0.6 inches from the middle. The uniformity of the distribution from approximately 0.15 inches to 0.45 inches provides linearity in the circuit and reduces the harmonic distortion as explained above. Good results have been obtained with a magnet length to pole length ratio of 1.25 and a coil length less than the length of the poles.

Figure 1:
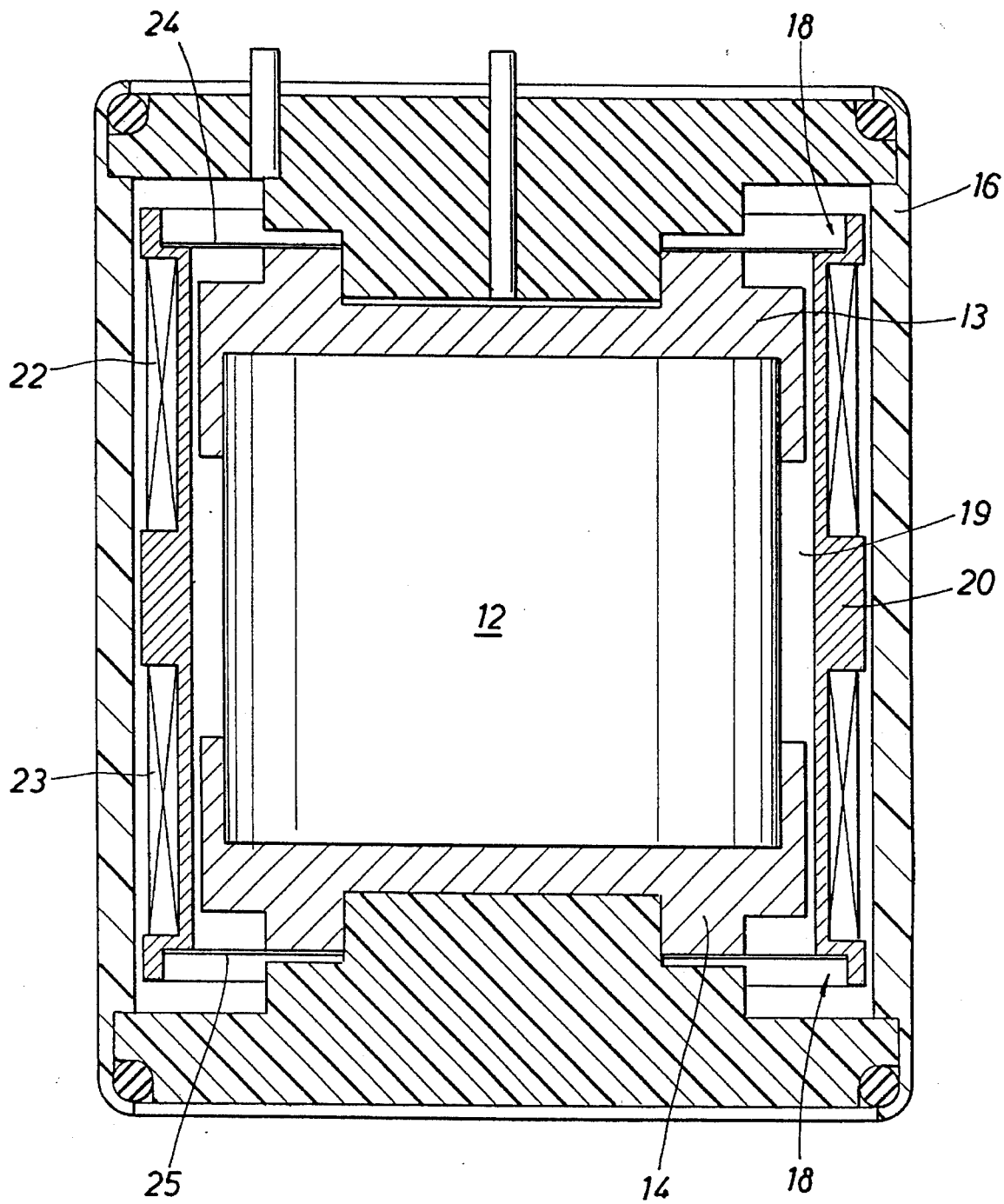
FIG. 1 is a vertical, cross-sectional view through a prior art geophone.
Figure 2:
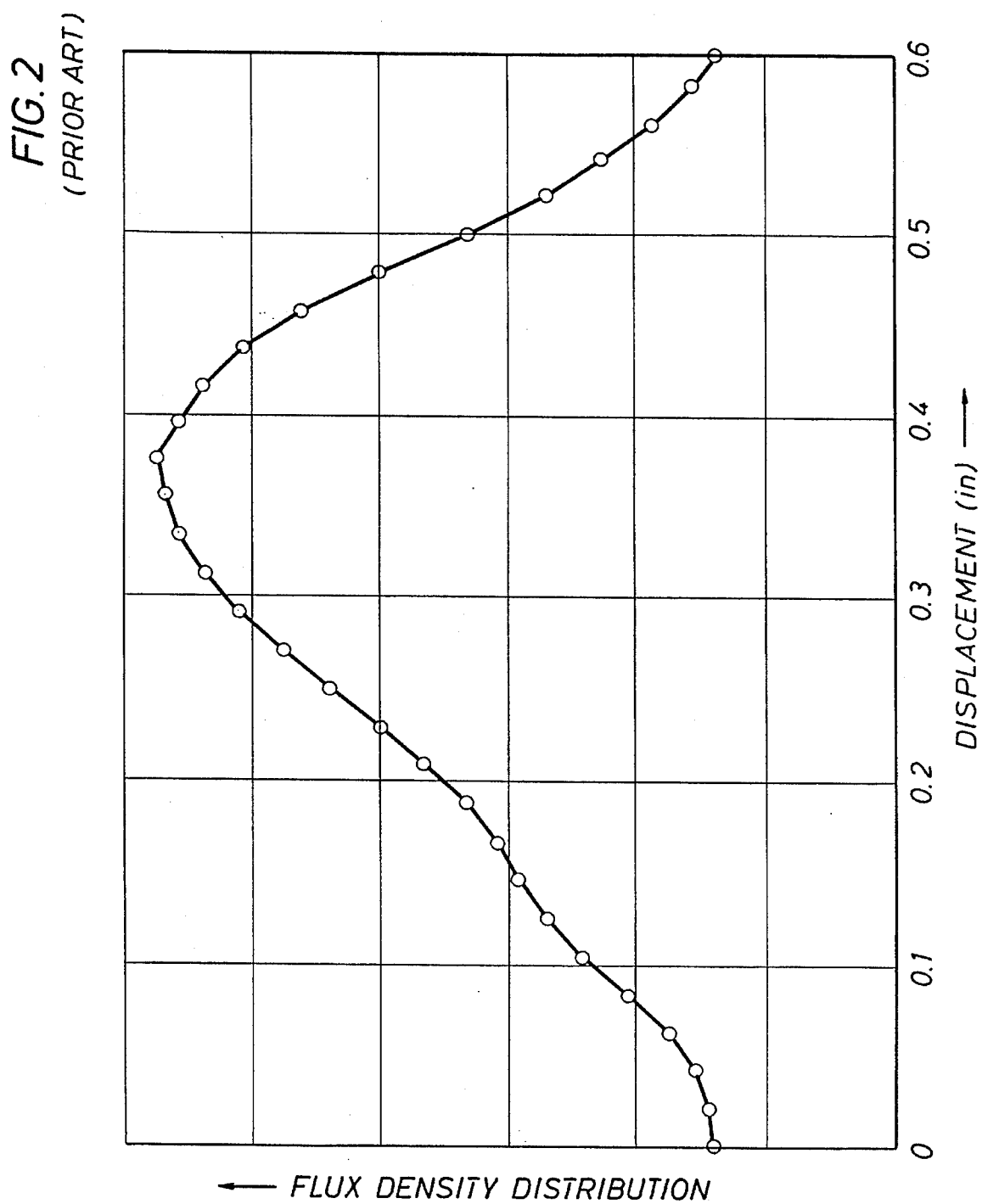
FIG. 2 is a graphical representation of the magnetic flux density of the geophone of FIG. 1.
Figure 6:
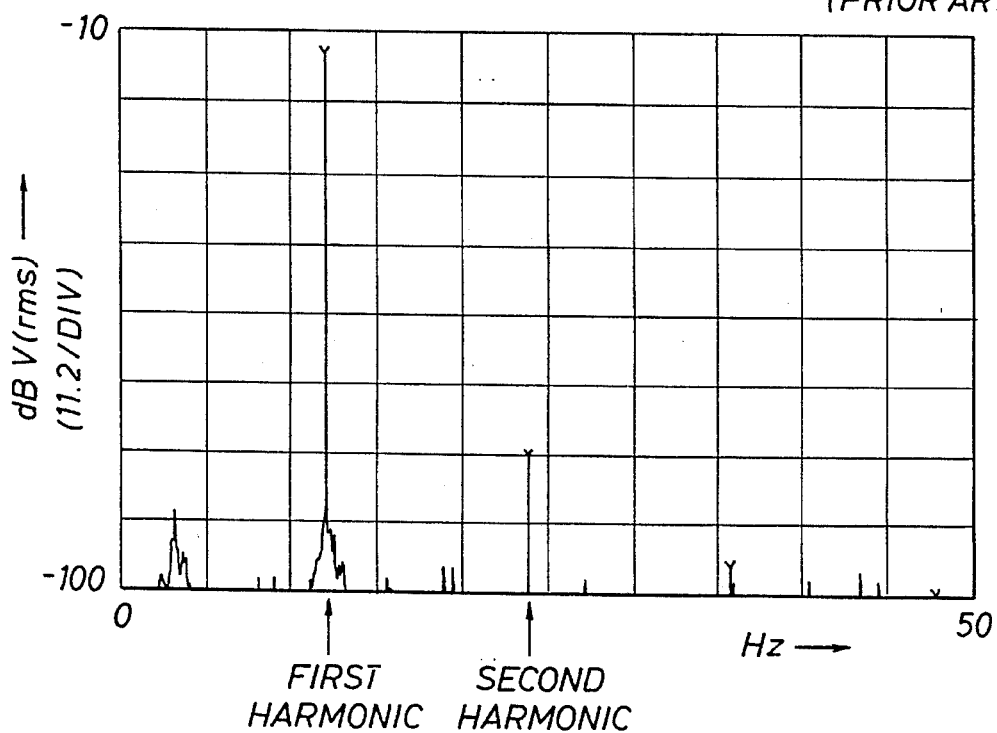
FIG. 6 is a graphical representation of the total harmonic distortion of a prior art geophone such as the geophone of FIG. 1.
Figure 7:
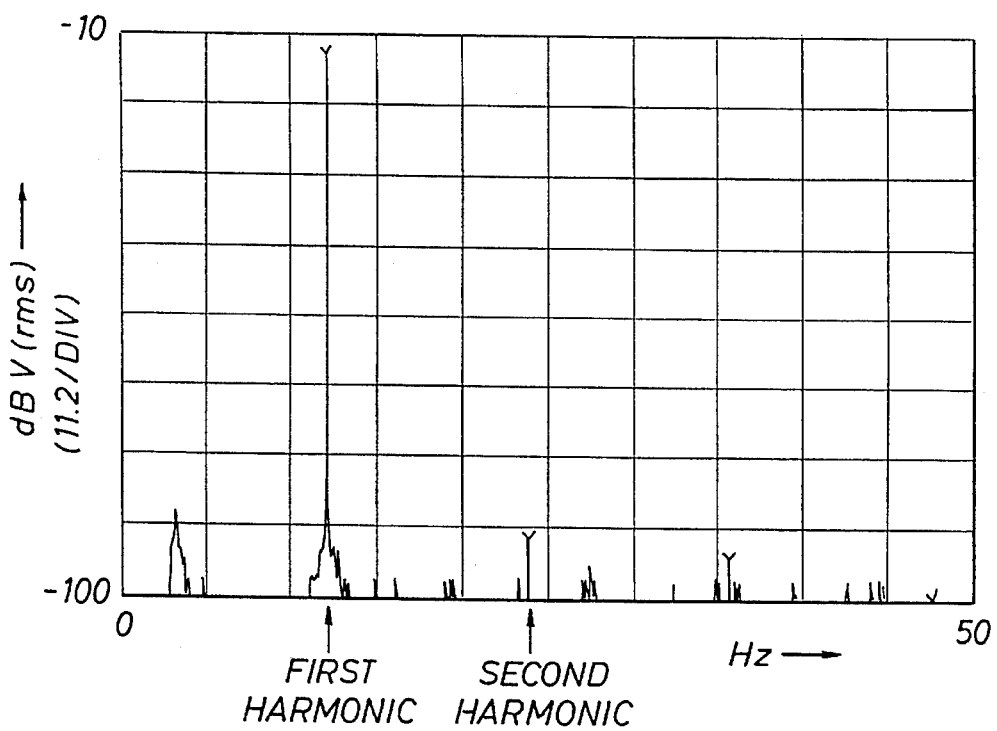
FIG. 7 is a graphical representation of the total harmonic distortion of the geophone of FIG. 3.

For example, FIG. 6 shows the total harmonic distortion of a prior art geophone such as the one shown in FIG. 1. FIG. 7 shows the total harmonic distortion of a geophone having a uniform magnetic field, made in accordance with this invention such as that shown in FIG. 3. The amplitude of the second harmonic produced by geophone non-linearity is significantly lower in a geophone producing a uniform magnetic field than a geophone producing a non-uniform magnetic field as shown in FIGS. 6 and 7. Results have shown that the uniform magnetic field produces an approximately twelve decibel reduction in amplitude.

The prior art geophone magnet length to pole piece length ratios range from 0.14 to 0.21, which are not sufficient to provide a wide enough uniform magnetic field to reduce the harmonic distortion.

It is also not necessary that the coil lengths be less than the pole piece lengths.

Although the invention described above is embodied in a rotational type geophone, where the coil form rotates freely relative to the magnet assembly, this invention could also be used with a pigtail-type geophone, where the coil form is restricted from free rotational movement relative to the magnet assembly.

From the foregoing it will be seen that this invention is one well adapted to attain all of the ends and objects hereinabove set forth, together with other advantages which are obvious and which are inherent to the apparatus and structure.

It will be understood that certain features and subcombinations are of utility and may be employed without reference to other features and subcombinations. This is contemplated by and is within the scope of the claims.

Because many possible embodiments may be made of the invention without departing from the scope thereof, it is to be understood that all matter herein set forth or shown in the accompanying drawings is to be interpreted as illustrative and not in a limiting sense.

What is claimed is:

1. A geophone comprising:

a cylindrical housing, a permanent magnet assembly comprising a cylindrical magnet having a longitudinal axis and flat ends and a coercive force of greater than 4000 oersteds and a residual induction of greater than 6000 gauss and disc-shaped pole pieces positioned at opposite ends of the magnet with one end of each pole piece in engagement with one end of the magnet, means mounting the magnet assembly in the cylindrical housing with an annular space between the magnet assembly and the housing so that a magnetic field is established between the pole pieces and the cylindrical housing in the annular space, a coil form having two axially spaced coils of electrically conductive wire thereon, each coil having a length less than the length of each pole piece, wherein the length of each pole piece is measured from the end of the magnet it engages to the opposite end of the pole piece, and spring means supporting the coil form in the annular space with each coil centered opposite one pole piece when the coil form is at rest for movement in the magnetic field along the longitudinal axis of the housing and the magnet due to seismic energy to produce an electrical signal.

2. The geophone of claim 1, wherein the ratio of the length of one pole piece to the length of the magnet is at least 0.5.

3. The geophone of claim 2, wherein the pole piece length to magnet length ratio is approximately 1.25 and the ratio of the length of the magnet in combination with the two pole pieces to the length of the cylindrical housing is approximately 0.56.

4. The geophone of claim 1, wherein the magnet is of rare earth material.

5. The geophone of claim 4, wherein the rare earth material is Samarium Cobalt.

6. The geophone of claim 5, wherein the rare earth material is coated with nickel plating.

7. A geophone comprising:

a cylindrical housing, a permanent magnet assembly comprising a cylindrical magnet and pole pieces positioned at opposite ends of the magnet with one end of each pole piece in engagement with one end of the magnet, means for mounting the magnet assembly in the cylindrical housing with an annular space between the magnet assembly and the housing so that a magnetic field is established between the pole pieces and the cylindrical housing in the annular space, a coil form having two axially spaced coils of electrically conductive wire thereon, each coil having a length less than the length of each pole piece, wherein the length of each pole piece is measured from the end of the magnet it engages to the opposite end of the pole piece, and spring means supporting the coil form in the annular space with each coil centered opposite one pole piece when the coil form is at rest for movement in the magnetic field along the longitudinal axis of the housing and the magnet due to seismic energy to produce an electrical signal.

8. The geophone of claim 7, wherein the ratio of the length of one pole piece to the length of the magnet is at least 0.5.

9. The geophone of claim 8, wherein the pole piece length to magnet length ratio is approximately 1.25 and the ratio of the length of the magnet in combination with the two pole pieces to the length of the cylindrical housing is approximately 0.56.

10. The geophone of claim 7, wherein the permanent magnet is a rare earth material.

11. The geophone of claim 10, wherein the rare earth material is coated with nickel plating.

12. The geophone of claim 7, wherein the rare earth material has a coercive force of greater than 4000 oersteds and a residual induction of greater than 6000 gauss.

13. A geophone comprising:

a cylindrical housing, a permanent magnet assembly comprising a cylindrical magnet having a coercive force of greater than 4000 oersteds and a residual induction of greater than 6000 gauss and pole pieces positioned on opposite ends of the magnet with the ratio of the length of one Dole piece to the length of the magnet being at least 0.5 and the ratio of the pole piece length to magnet length ratio is approximately 1.25 and the ratio of the length of the magnet in combination with the two pole pieces to the length of the cylindrical housing is approximately 0.56, means for mounting the magnet assembly in the cylindrical housing with an annular space between the magnet assembly and the housing so that a uniform magnetic field is established between the pole pieces and the cylindrical housing in the annular space within which the coil form moves, a coil form having two axially spaced coils of electrically conductive wire thereon, and spring means supporting the coil form in the annular space with each coil centered opposite one pole piece when the coil form is at rest for movement in the uniform magnetic field along the longitudinal axis of the housing and the magnet due to seismic energy to produce an electrical signal.

14. The geophone of claim 13, wherein the magnet is of a rare earth material.

15. A geophone comprising:

a cylindrical housing, a permanent magnet assembly comprising a cylindrical magnet and pole pieces positioned at opposite ends of the magnet with one end of each pole piece in engagement with one end of the magnet, wherein the ratio of the length of one pole piece to the length of the magnet is at least 0.5 and the length of each pole piece is measured from the magnet end to the other end of the pole piece, means mounting the magnet assembly in the cylindrical housing with an annular space between the magnet assembly and the housing, so that a uniform magnetic field is established between the pole pieces and the cylindrical housing in the annular space, and a coil form having two axially spaced coils of electrically conductive wire thereon, and spring means supporting the coil form in the annular space with each coil centered opposite one pole piece when the coil form is at rest for movement in the magnetic field along the longitudinal axis of the housing and the magnet due to seismic energy to produce an electrical signal.

16. The geophone of claim 15, wherein the pole piece length to magnet length ratio is approximately 1.25 and the ratio of the length of the magnet in combination with the two pole pieces to the length of the cylindrical housing is approximately 0.56.

17. The geophone of claim 15, wherein the magnet has a coercive force of greater than 4000 oersteds and a residual induction of greater than 6000 gauss.

18. The geophone of claim 15, wherein the magnet is of a rare earth material.

* * * * *